United States Patent
Yoshida

(10) Patent No.: US 11,339,914 B2
(45) Date of Patent: May 24, 2022

(54) LINEAR STAGE

(71) Applicant: SUMITOMO HEAVY INDUSTRIES, LTD., Tokyo (JP)

(72) Inventor: Tatsuya Yoshida, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/145,216

(22) Filed: Sep. 28, 2018

(65) Prior Publication Data

US 2019/0024841 A1      Jan. 24, 2019

Related U.S. Application Data

(63) Continuation of application No. PCT/JP2017/009844, filed on Mar. 10, 2017.

(30) Foreign Application Priority Data

Mar. 29, 2016   (JP) .............................. JP2016-065080

(51) Int. Cl.
*F16M 11/04*   (2006.01)
*G12B 5/00*   (2006.01)
*F16M 11/18*   (2006.01)

(52) U.S. Cl.
CPC ......... *F16M 11/043* (2013.01); *F16M 11/045* (2013.01); *F16M 11/048* (2013.01); *G12B 5/00* (2013.01); *F16M 11/18* (2013.01)

(58) Field of Classification Search
CPC .. F16M 11/043; F16M 11/045; F16M 11/048; F16M 11/18; G12B 5/00

USPC ....... 248/644, 646, 647, 648, 649, 650, 651, 248/652, 653, 656, 657, 658, 660, 661
See application file for complete search history.

(56) References Cited

U.S. PATENT DOCUMENTS

| | | | | |
|---|---|---|---|---|
| 1,088,124 A | * | 2/1914 | Chevrolet et al. | ..... F16M 11/12 248/660 |
| 2,302,812 A | * | 11/1942 | Stempel | ..... F16H 7/14 248/660 |
| 2,400,224 A | * | 5/1946 | Christensen | ..... B60K 5/1283 248/660 |
| 3,495,519 A | * | 2/1970 | Bluitt | ..... G03B 21/116 108/137 |

(Continued)

FOREIGN PATENT DOCUMENTS

| | | |
|---|---|---|
| JP | H02-100748 U | 8/1990 |
| JP | H03-060938 A | 3/1991 |

(Continued)

*Primary Examiner* — Eret C McNichols
*Assistant Examiner* — Michael McDuffie
(74) *Attorney, Agent, or Firm* — HEA Law PLLC

(57) ABSTRACT

Afforded is a linear stage including first, second, and third supporting parts disposed on a supporting flat surface, a first shaft supported by the first and second supporting parts and extending in a first direction, a second shaft supported by the third supporting part and provided extending in the first direction, and a translating carriage translated in the first direction, guided by the first shaft and the second shaft. At least one supporting part among the first, second, and third supporting parts supports the shaft supported by that supporting part in a way such as to be displaceable in a second direction orthogonal to the first direction and parallel to the supporting flat surface.

10 Claims, 5 Drawing Sheets

(56) References Cited

U.S. PATENT DOCUMENTS

| | | | | |
|---|---|---|---|---|
| 3,659,814 | A | * | 5/1972 | Rode .................. F16M 7/00 248/649 |
| 4,272,892 | A | * | 6/1981 | Rose .................. G01B 5/0002 324/750.25 |
| 4,434,824 | A | * | 3/1984 | Bussey ................ B23Q 9/0078 144/136.95 |
| 4,691,586 | A | * | 9/1987 | van Leijenhorst ... F16M 11/043 74/490.09 |
| 4,750,970 | A | * | 6/1988 | Malosh ................. B29C 65/08 156/580.1 |
| 4,995,277 | A | * | 2/1991 | Yanagisawa ......... B23Q 1/4809 248/657 |
| 4,995,288 | A | * | 2/1991 | DellaPolla ........... B23D 45/024 83/471.3 |
| 5,040,431 | A | * | 8/1991 | Sakino ................. F16C 29/025 108/143 |
| 5,195,391 | A | * | 3/1993 | Barbat ................... B23Q 1/267 248/657 |
| 5,201,489 | A | * | 4/1993 | Wolf .................... B29C 33/485 248/634 |
| 5,216,932 | A | * | 6/1993 | Takei .................... B23Q 1/621 248/657 |
| 5,217,214 | A | * | 6/1993 | Takei ....................... G12B 5/00 269/73 |
| 5,251,501 | A | * | 10/1993 | Katahira ................ B23Q 5/402 108/143 |
| 5,311,791 | A | * | 5/1994 | Yanagisawa ........... B23Q 1/621 108/143 |
| 5,377,897 | A | * | 1/1995 | Zimmer .................... G12B 5/00 228/106 |
| 5,427,349 | A | * | 6/1995 | Obrecht .................. B21D 28/00 248/188.4 |
| 5,526,708 | A | * | 6/1996 | Hill .......................... H02K 5/00 192/103 B |
| 5,586,468 | A | * | 12/1996 | Tomotaki ............... B23Q 5/408 108/143 |
| 5,678,944 | A | * | 10/1997 | Slocum ................... F16F 15/04 403/13 |
| 5,692,728 | A | * | 12/1997 | Shiozawa ................ B23Q 3/18 248/562 |
| 5,730,031 | A | * | 3/1998 | Paul ...................... G11B 17/057 248/657 |
| 6,327,929 | B1 | * | 12/2001 | Yanagisawa ........... B23Q 1/017 108/143 |
| 7,234,675 | B2 | * | 6/2007 | Ueno ....................... B23Q 1/58 248/657 |
| 2009/0050782 | A1 | * | 2/2009 | Forster .................... F16C 29/00 248/657 |
| 2012/0168391 | A1 | * | 7/2012 | Liu ........................ F16M 11/18 211/26 |
| 2016/0223127 | A1 | * | 8/2016 | Li ........................... H02N 2/126 |

FOREIGN PATENT DOCUMENTS

| | | |
|---|---|---|
| JP | 2000-214280 A | 8/2000 |
| JP | 2012-160663 A | 8/2012 |

* cited by examiner

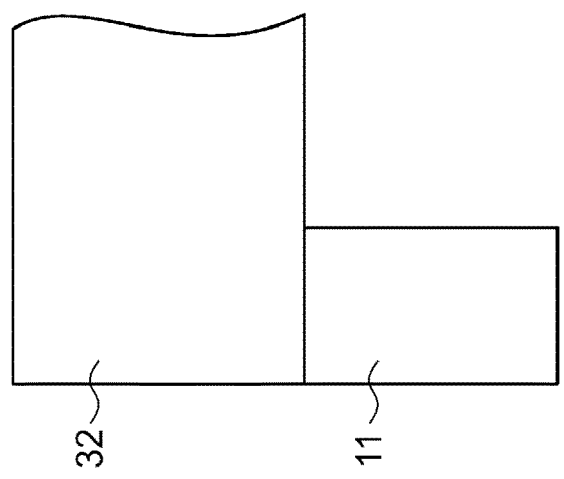
FIG. 2C
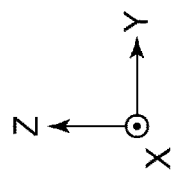
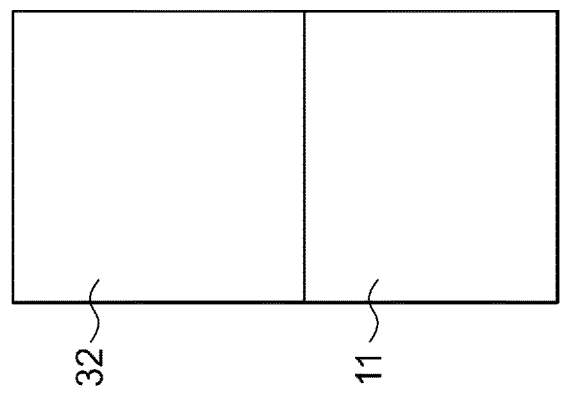
FIG. 2B
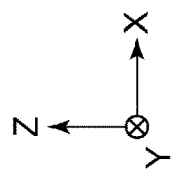
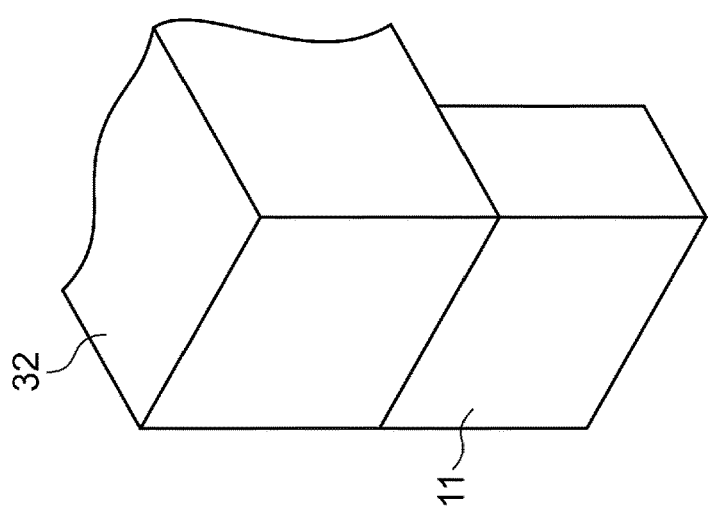
FIG. 2A

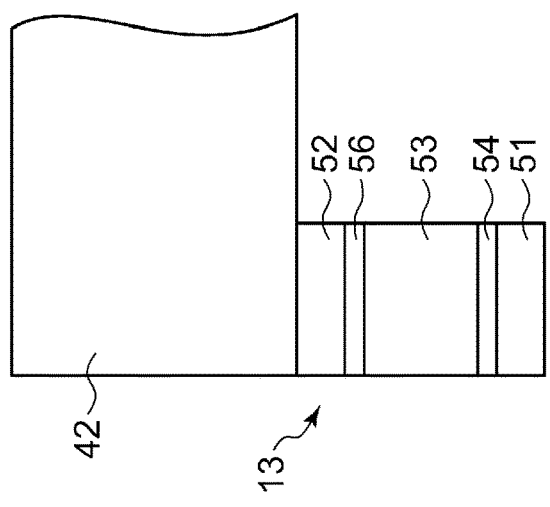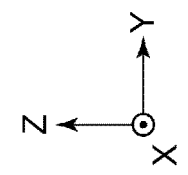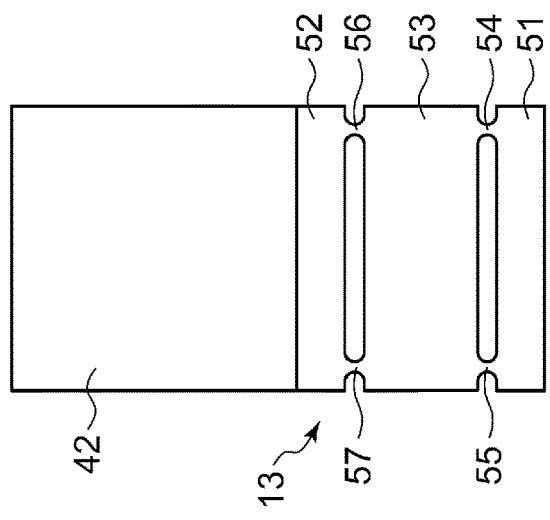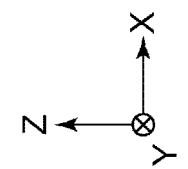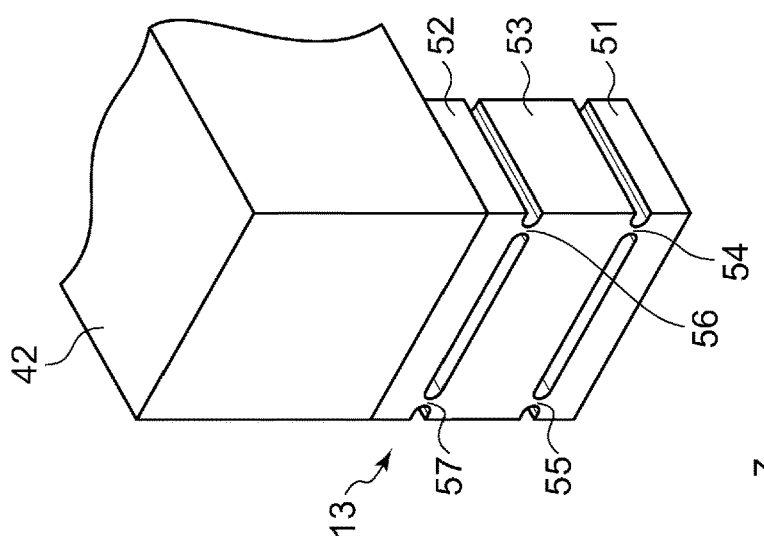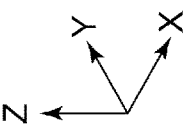
FIG. 3A
FIG. 3B
FIG. 3C

LINEAR STAGE

INCORPORATION BY REFERENCE

The contents of Japanese Patent Application No. 2016-065080, and of International Patent Application No. PCT/JP2017/009844, on the basis of each of which priority benefits are claimed in an accompanying application data sheet, are in their entirety incorporated herein by reference.

BACKGROUND

Technical Field

The present invention in certain embodiments relates to linear stages.

Description of Related Art

Linear stages for positioning an object of interest are known. To date, a linear stage furnished with two shafts provided in parallel, and a translating carriage fixed to a platform on which an object of interest is carried and that is translated guided on the two shafts has been proposed.

SUMMARY

The invention in one aspect makes available a stage device including first, second, and third supporting parts that are disposed on a supporting flat surface, a first shaft that is supported by the first and second supporting parts and extends in a first direction, a second shaft that is supported by the third supporting part and is provided extending in the first direction, and a translating carriage that is guided by the first shaft and the second shaft and moves in the first direction. At least one supporting part among the first, second, and third supporting parts supports the shaft supported by that supporting part in a way such as to be displaceable in a second direction that is orthogonal to the first direction and is parallel to the supporting flat surface.

Any combination of the configuration elements described above, or an embodiment, in which a configuration element or description of the invention is switched between methods, devices, and systems, is also effective as an aspect of the invention.

BRIEF DESCRIPTION OF THE DRAWINGS

FIGS. 2A to 2C are views illustrating a first supporting part and its environs, from FIG. 1.

FIGS. 3A to 3C are views illustrating a third supporting part and its environs, from FIG. 1.

DETAILED DESCRIPTION

Since the translating carriage moves by being guided by the two shafts in the linear stage of the related art described above, the shafts can interfere with the translating carriage if assembly is not carried out in a way such that the two shafts are parallel to each other as designed. Therefore, it is necessary to assemble the linear stage of the related art at a relatively high assembling accuracy such that the two shafts are parallel to each other as designed, and thus assembling work is difficult.

The invention is devised in view of such circumstances, and it is desirable to provide a linear stage that allows relatively easy assembling work and can deter interference between the shafts guiding the translating carriage, and the translating carriage itself.

Hereinafter, the same or equivalent configuration elements, members, and processes, which are illustrated in each drawing, will be assigned with the same reference symbols and overlapping description will be omitted as appropriate. The dimension of a member in each drawing is enlarged or reduced as appropriate in order to facilitate the understanding. In addition, some of members that are not important in describing an embodiment will be omitted in each drawing.

Figure 1A:
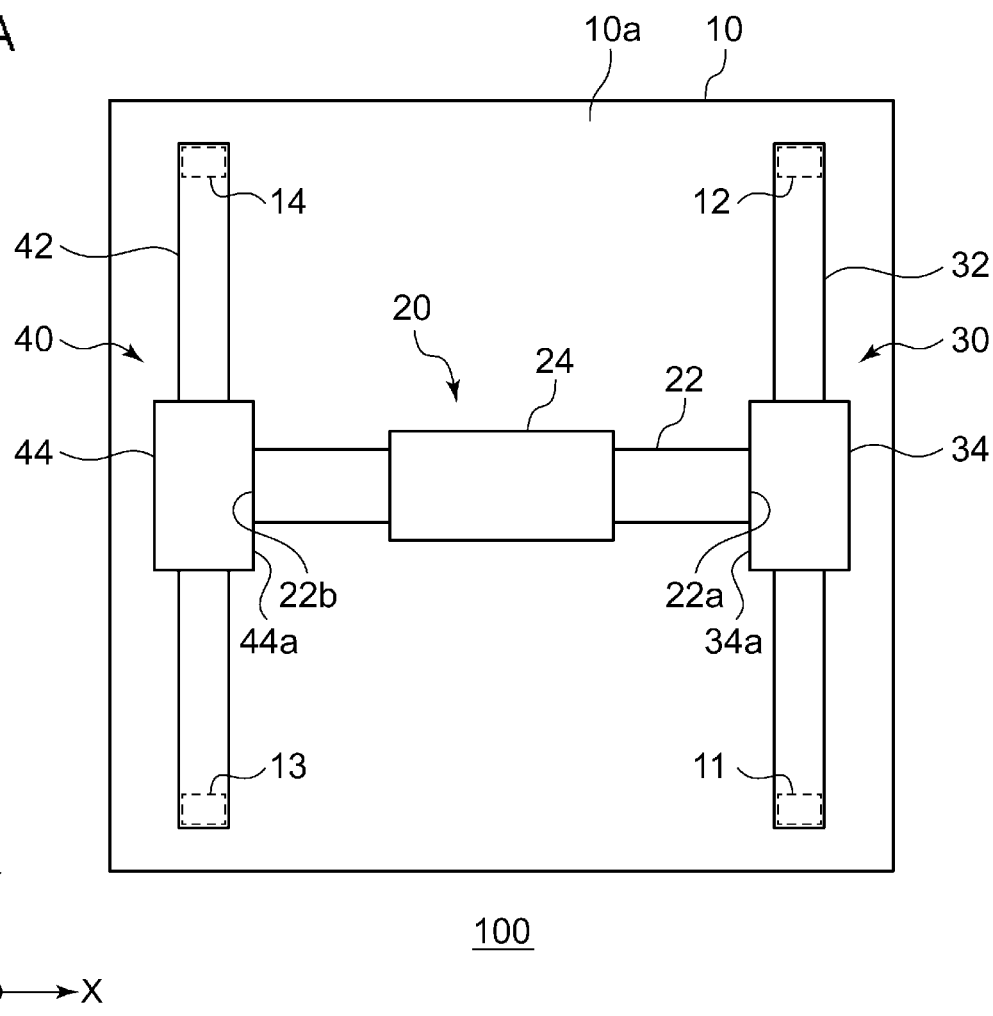
FIGS. 1A and 1B are views illustrating a linear stage according to one embodiment.
Figure 1B:
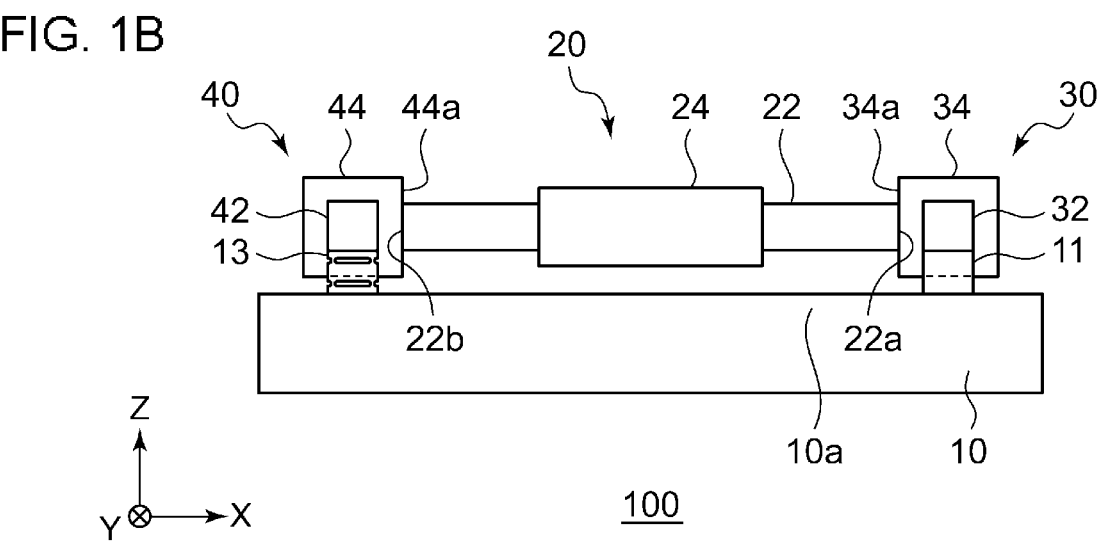

FIGS. 1A and 1B are views illustrating a linear stage 100 according to one embodiment. FIG. 1A is a top view of the linear stage 100. FIG. 1B is a side view of the linear stage 100. For convenience of description, as illustrated in the drawings, an x-axis direction, which is a direction parallel to a surface 10a (to be described later), a y-axis direction, which is a direction orthogonal to the x-axis direction and is parallel to the surface 10a, and a z-axis direction, which is a direction orthogonal to both of the directions (that is, orthogonal to the surface 10a), define the xyz-orthogonal coordinate system. The stage device 100 is referred to as an xy-stage, and positions an object in the x-axis direction and the y-axis direction.

The stage device 100 includes a surface plate 10, a first supporting part 11, a second supporting part 12, a third supporting part 13, a fourth supporting part 14, an x-axis unit 20, a first y-axis unit 30, and a second y-axis unit 40.

The surface plate 10 is a rectangular sheetlike member in plan view. The surface 10a, which is an upper surface of the surface plate 10, is formed to be flat. The first supporting part 11 to the fourth supporting part 14 are disposed in the four corners of the surface 10a respectively. That is, the surface 10a functions as a supporting flat surface on which the four supporting parts are disposed.

The first y-axis unit 30 includes a first y-axis guide 32 and a first y-axis slider 34. The first y-axis guide 32 is a member having a square pillar shape. The first y-axis guide 32 is disposed such that a longitudinal direction thereof matches the y-axis direction. Both ends of the first y-axis guide are supported by the first supporting part 11 and the second supporting part 12, which are provided on the surface plate 10.

The first y-axis slider 34 is a tubular body having a rectangular section, and the first y-axis guide 32 is inserted into the first y-axis slider. The first y-axis slider 34 is configured to be movable along the first y-axis guide 32 in the y-axis direction. In the present embodiment, the first y-axis slider 34, together with the first y-axis guide 32, configures an air slide, and is floated with respect to the first y-axis guide 32 by compressed gas supplied to the interval between the first y-axis slider and the first y-axis guide, wherein the air slide is translated along the first y-axis guide 32 in a state of non-contact with the first y-axis guide 32.

The second y-axis unit 40 includes a second y-axis guide 42 and a second y-axis slider 44. The second y-axis guide 42 and the second y-axis slider 44 are configured the same as the first y-axis guide 32 and the first y-axis slider 34. The second y-axis guide 42 is disposed so as to have a longitudinal direction matching the y-axis direction and to be arranged side by side with the first y-axis guide 32—that is, given design considerations, arranged parallel to the first y-axis guide 32.

The x-axis unit 20 includes an x-axis guide 22 and an x-axis slider 24. The x-axis guide 22 is connected to the first y-axis slider 34 and the second y-axis slider 44 such that a longitudinal direction thereof matches the x-axis direction. In particular, in order to lower the center of gravity, the x-axis guide 22 is connected such that a first end surface 22a opposes a side surface (side surface opposing the second y-axis slider 44) 34a of the first y-axis slider 34 and a second end surface 22b opposes a side surface (side surface opposing the first y-axis slider 34) 44a of the second y-axis slider 44.

The x-axis slider 24 is a tubular body having a rectangular section, and the x-axis guide 22 is inserted into the x-axis slider. As the first y-axis slider 34 and the second y-axis slider 44, the x-axis slider 24 is supported by the x-axis guide 22 in a non-contacting state.

A platform (not illustrated) is fixed to the x-axis slider 24. An object of interest, such as a semiconductor wafer, is carried by the platform. It is possible to move the table in an xy direction to position the object in the xy direction by moving the first y-axis slider 34 and the second y-axis slider 44 in the y-axis direction and moving the x-axis slider 24 in the x-axis direction.

FIGS. 2A to 2C are views illustrating the first supporting part 11 and its environs. FIG. 2A is a perspective view illustrating the first supporting part 11 and its environs. FIG. 2B is a side view of the first supporting part 11 seen from the y-axis direction. FIG. 2C is a side view of the first supporting part 11 seen from the x-axis direction. Although a configuration of the first supporting part 11 is described as a representative, the same description applies also to the second supporting part 12 and the fourth supporting part 14.

The first supporting part 11 fixes and supports the first y-axis guide 32. In other words, the first supporting part 11 supports the first y-axis guide 32 such that the first y-axis guide is not displaceable in both of the x-axis direction and the y-axis direction (also in the z-axis direction). In other words, the first supporting part 11 supports and restrains the first y-axis guide 32. In the present embodiment, the first supporting part 11 is formed in a rectangular parallelepiped shape. A lower surface of the first supporting part is fixed to the surface 10a, and an upper surface of the first supporting part is fixed to the first y-axis guide 32. A material, a width in the x-axis direction, a width in the y-axis direction, and a width in the z-axis direction of the first supporting part 11 are determined based on experiments or simulations, such that the first y-axis guide 32 can be supported so as not to be displaceable, that is, such that the first supporting part 11 itself does not deform.

FIGS. 3A to 3C are views illustrating the third supporting part 13 and its environs. FIGS. 3A to 3C correspond to FIGS. 2A to 2C respectively.

The third supporting part 13 supports the second y-axis guide 42 such that the second y-axis guide is displaceable in the x-axis direction and is not displaceable in the y-axis direction and the z-axis direction. In the present embodiment, the third supporting part 13 includes a first base 51, a second base 52, an intermediate portion 53, a first elastic hinge 54, a second elastic hinge 55, a third elastic hinge 56, and a fourth elastic hinge 57.

The first base 51, the intermediate portion 53, and the second base 52 are in each case shaped in a rectangular parallelepiped form, and in that order, they are arranged in the z-axis direction. The first base 51 is fixed to the surface 10a. The second y-axis guide 42 is fixed to an upper surface of the second base 52.

The first elastic hinge 54 and the second elastic hinge 55 are provided in parallel between the first base 51 and the intermediate portion 53 and connect the first base 51 to the intermediate portion 53. The third elastic hinge 56 and the fourth elastic hinge 57 are provided in parallel between the second base 52 and the intermediate portion 53 and connect the second base 52 to the intermediate portion 53.

All of the first elastic hinge 54, the second elastic hinge 55, the third elastic hinge 56, and the fourth elastic hinge 57 are sheetlike elastic hinges having small sectional areas compared to the first base 51, the second base 52, and the intermediate portion 53. Specifically, the four elastic hinges are formed to be relatively thick (wide) in the y-axis direction and are formed to be relatively thin (narrow) in the x-axis direction. In the present embodiment, each of the four elastic hinges is formed to have a thickness in the y-axis direction which is the same as the first base 51 or the like, and to have the thinnest portion having a thickness in the x-axis direction which is 1/20 or less of the thickness of the first base 51 or the like.

Since the four elastic hinges are formed to be thin in the x-axis direction as described above, the elastic hinges are capable of deforming around an axis parallel to the y-axis direction. Accordingly, the second base 52 and the second y-axis guide 42 fixed to the second base 52 can minutely move in the x-axis direction with respect to the first base 51. As described above, the third supporting part 13 supports the second y-axis guide 42 so as to be displaceable in the x-axis direction by the third supporting part itself being displaced in the x-axis direction. The width of each of the four elastic hinges in the x-axis direction is determined based on experiments or simulations so as to allow such displacement.

Next, effects that can be achieved by the embodiment will be described.

The x-axis guide 22 connects the first y-axis slider 34 to the second y-axis slider 44. The first y-axis slider 34 and the second y-axis slider 44 are configured to respectively move along the first y-axis guide 32 and the second y-axis guide 42, which are disposed to be parallel to each other. That is, one translating carriage, which is configured by the first y-axis slider 34, the second y-axis slider 44, and the x-axis guide 22, is configured to move along the two y-axis guides which are disposed to be parallel to each other. However, although the first y-axis guide 32 and the second y-axis guide 42 are parallel to each other on design, the first y-axis guide and the second y-axis guide are not parallel to each other in a strict sense due to an assembly error. In this case, the translating carriage, which is configured by the first y-axis slider 34, the second y-axis slider 44, and the x-axis guide 22, moves along the two y-axis guides which are not parallel to each other. Therefore, scuffing, in which the translating carriage comes into contact (that is, interferes) with the two y-axis guides, can occur. Specifically, scuffing, in which the first y-axis slider 34 and the second y-axis slider 44 come into contact with the first y-axis guide 32 and the second y-axis guide 42 respectively, can occur.

In contrast, the third supporting part 13 supports the second y-axis guide 42 so as to be displaceable in the x-axis direction in the embodiment. That is, the third supporting part 13 does not restrain the second y-axis guide 42 in the x-axis direction. For this reason, the second y-axis guide 42 is pushed by a compressed gas supplied to a location between the second y-axis guide 42 and the second y-axis slider 44 and can be displaced in the x-axis direction.

Therefore, even in a case where the first y-axis guide 32 and the second y-axis guide 42 are not parallel to each other, the second y-axis guide 42 can be displaced in the x-axis direction in a way that does not cause the occurrence of scuffing with the movement of the first y-axis guide 32, the second y-axis guide 42, and the x-axis unit 20. That is, scuffing does not occur, or the occurrence of scuffing is deterred in the embodiment. To wit, it is not necessary to assemble the stage device in a way that the first y-axis guide 32 and the second y-axis guide 42 are parallel to each other in a strict sense since scuffing does not occur even if the first y-axis guide 32 and the second y-axis guide 42 are not parallel to each other in a strict sense. Therefore, it is relatively easy to assemble the stage device 100.

In addition, the first y-axis guide 32 can serve as reference since the first y-axis guide is fixed and supported by the first supporting part 11 and the second supporting part 12, that is, since the first y-axis guide is supported at two locations in a way not displaceable in the x-axis direction, in the embodiment. Therefore, insofar as assembling is carried out accurately in the y-axis direction such that the first y-axis guide 32 becomes reference, the first y-axis slider 34, the second y-axis slider 44, and the x-axis unit 20 can move in the y-axis direction along the first y-axis guide 32, which is the reference, and thus a high positioning accuracy can be realized.

The stage device has been described hereinbefore in the embodiment. The embodiment is merely an example. It is clear for those skilled in the art that a variety of modification examples can be made in combination of respective configuration elements or respective processes, and such modification examples also fall within the scope of the invention. Modification examples are as follows.

Modification Example 1

Although not particularly described in the embodiment, various modification examples can be considered as a configuration of the third supporting part which supports the second y-axis guide 42 so as to be displaceable in the x-axis direction.

Figure 4A:
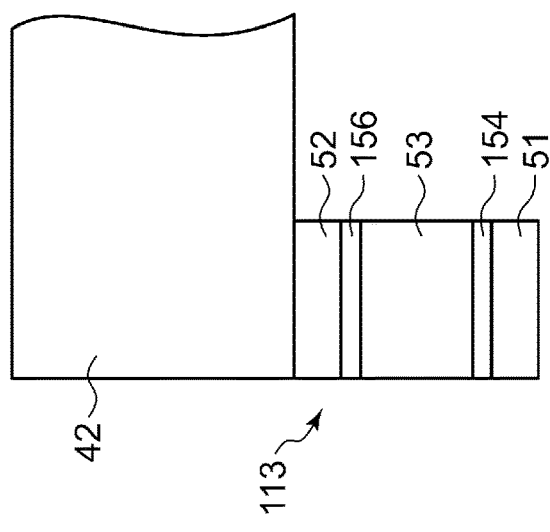
FIGS. 4A to 4C are views illustrating a third supporting part and its environs, in a linear stage according to a modification example.
Figure 4B:
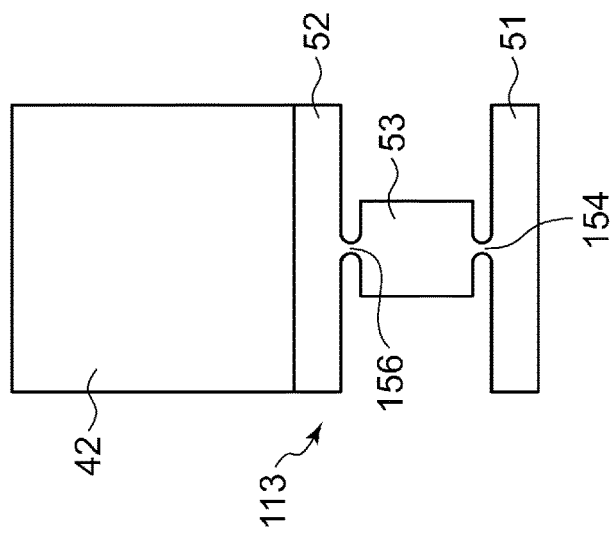
Figure 4C:
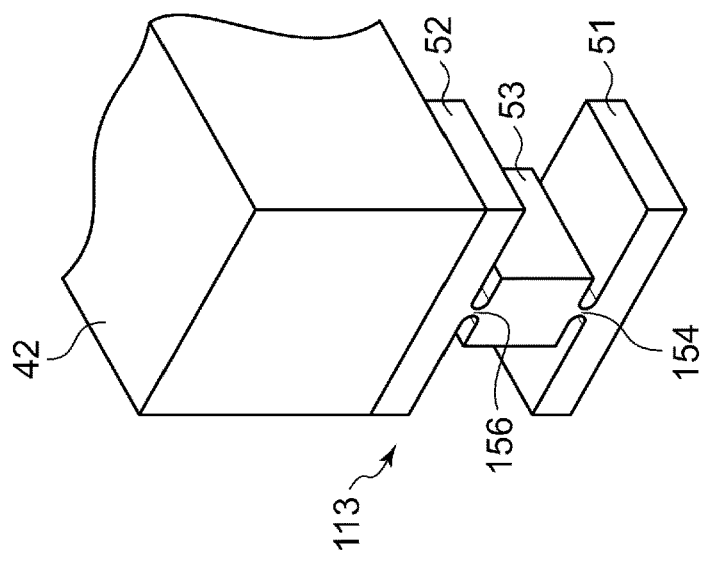

FIGS. 4A to 4C are views illustrating a third supporting part 113 of a stage device according to a modification example. FIGS. 4A to 4C correspond to FIGS. 3A to 3C respectively. In the modification example, the third supporting part 113 includes the first base 51, the second base 52, the intermediate portion 53, a first elastic hinge 154, and a second elastic hinge 156. The first elastic hinge 154 is provided between the first base 51 and the intermediate portion 53 and connects the first base 51 to the intermediate portion 53. The second elastic hinge 156 is provided between the second base 52 and the intermediate portion 53 and connects the second base 52 to the intermediate portion 53. That is, one elastic hinge is provided between the first base 51 and the intermediate portion 53, and one elastic hinge is provided between the second base 52 and the intermediate portion 53 in the modification example. The same effects as the embodiment described above can be achieved in the modification example.

In addition, the third supporting part may be configured to include, for example, another mechanism having the same function as the elastic hinge, that is, another mechanism that does not have friction or hysteresis, instead of the elastic hinge. The third supporting part may be configured to include, for example, a linear motion bearing or an air bearing, instead of the elastic hinge.

Modification Example 2

Although a case where one end side of the second y-axis guide 42 is supported by the third supporting part 13 such that the second y-axis guide is displaceable in the x-axis direction and the other side of the second y-axis guide is fixed and supported by the fourth supporting part 14 has been described in embodiment and the modification example described above, without being limited thereto, the second y-axis guide 42 may be supported such that both end sides thereof are displaceable in the x-axis direction. That is, the fourth supporting part 14 may be configured the same as the third supporting part 13.

Modification Example 3

Although a case where both ends of the first y-axis guide 32 are fixed and supported has been described in the one embodiment and in the modification examples described above, the invention is not limited thereto. One end of the first y-axis guide 32 may be fixed and supported, and the other end of the first y-axis guide may be supported such that the other end is not displaceable in the x-axis direction and is displaceable in the y-axis direction.

Figure 5C:
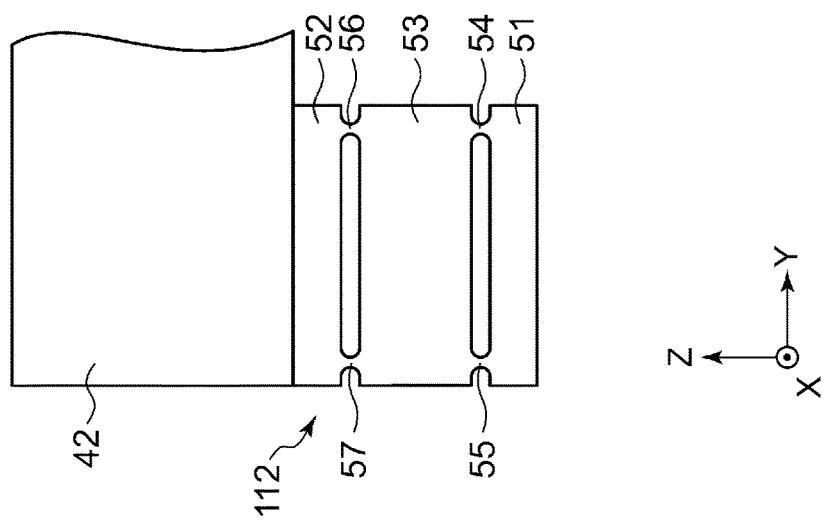
FIGS. 5A to 5C are views illustrating a second supporting part and its environs, in a linear stage according to another modification example.
Figure 5B:
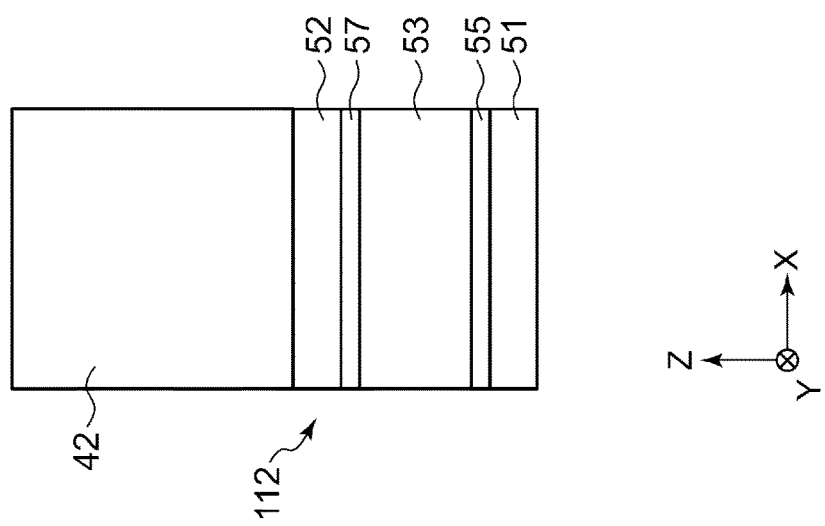
Figure 5A:
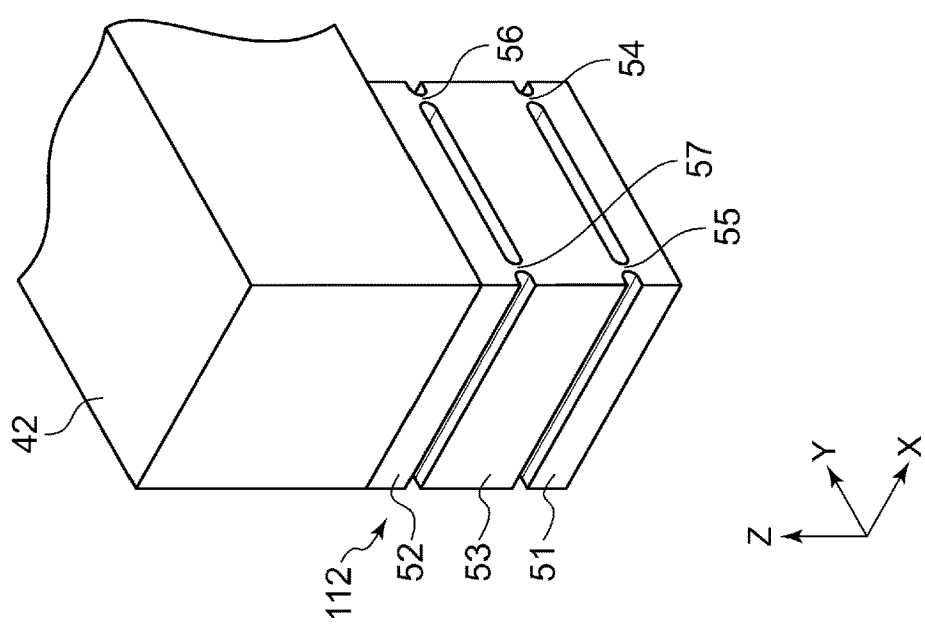

For example, the second supporting part may make the first y-axis guide 32 not displaceable in the x-axis direction and displaceable in the y-axis direction. FIGS. 5A to 5C are views illustrating a second supporting part 112 of a stage device according to a modification example. FIGS. 5A to 5C correspond to FIGS. 3A to 3C respectively. The second supporting part 112 is configured such that the third supporting part 13 of FIGS. 3A to 3C is rotated 90 degrees around an axis parallel to the z-axis.

The first y-axis guide 32 is fixed and supported by the first supporting part 11, but the first y-axis guide is supported by the second supporting part 12 such that the first y-axis guide is displaceable in the y-axis direction in the modification example. Accordingly, the first y-axis guide 32 can be displaced in the y-axis direction. Herein, the third supporting part 13 supports the second y-axis guide 42 such that the second y-axis guide is displaceable in the x-axis direction and is not displaceable in the y-axis direction. However, since the third supporting part 13 includes the elastic hinge, supporting rigidity in the y-axis direction exacerbates, and, in a strict sense, only slight displacement in the y-axis direction is allowed. That is, in a strict sense, the second y-axis guide 42 is supported such that the second y-axis guide is minutely displaceable also in the y-axis direction. In contrast, since also the first y-axis guide 32 is supported such that the first y-axis guide is displaceable in the y-axis direction in the modification example, the supporting rigidity of each of the first y-axis guide 32 and the first y-axis slider 34 in the y-axis direction can be uniformized.

In addition, even in a case where a temperature change has occurred in the first y-axis guide 32 with an ambient temperature change or the like, the first y-axis guide 32 can be expanded or contracted in the y-axis direction in the modification example. Thus, a thermal stress does not occur in the first y-axis guide 32 or a thermal stress that occurs in the first y-axis guide 32 can be reduced. The occurrence of deflection in the first y-axis guide 32 can be deterred.

Modification Example 4

Although a case where the first y-axis slider 34 and the second y-axis slider 44 respectively restrain the first y-axis guide 32 and the second y-axis guide 42 on all sides has been described in the embodiment, the invention is not limited thereto. The first y-axis slider 34 and the second y-axis slider 44 may be configured to respectively open lower surfaces of the first y-axis guide 32 and the second y-axis guide 42. That is, each of the first y-axis slider 34 and the second y-axis slider 44 may be configured, for example, such that a shape of a section orthogonal to the y-axis direction is a recessed shape. In this case, it is possible for the supporting parts to support other than both ends of the first y-axis guide 32 and the second y-axis guide 42.

Modification Example 5

Although a case where the y-axis guide and the y-axis slider configure an air slide has been described in the embodiment and the modification examples described above, the invention is not limited thereto. The y-axis slider may be configured to be movable along the y-axis guide, or for example, the y-axis guide and the y-axis slider may configure a ball screw mechanism. In this case, a screw shaft functions as the y-axis guide, a nut functions as the y-axis slider, and the screw shaft functioning as the y-axis guide is supported by the supporting part. In addition, for example, the y-axis guide and the y-axis slider may configure a linear motor. In this case, the stator functions as the y-axis guide, the rotor functions as the y-axis slider, and the stator functioning as the y-axis guide is supported by the supporting part.

Modification Example 6

Although a case where each of the first y-axis guide 32 and the second y-axis guide 42 is supported by the two supporting part has been described in the embodiment and the modification examples described above, the invention is not limited thereto. It is sufficient that one of the first y-axis guide 32 and the second y-axis guide 42 is supported by a plurality of supporting parts, the other one is supported by at least one supporting part, and at least one of the plurality of supporting parts supporting the first y-axis guide 32 and the second y-axis guide 42 can support the y-axis guide so as to be displaceable in the x-axis direction. That is, it is sufficient that the first y-axis guide 32 and the second y-axis guide 42 are supported by in total three or more supporting parts, and at least one of the supporting parts can support the y-axis guide, which is being supported by this supporting part, so as to be displaceable in the x-axis direction.

For example, the first y-axis guide 32 and the second y-axis guide 42 may be supported by in total three supporting parts. Specifically, for example, the first y-axis guide 32 may be supported by two supporting parts, the second y-axis guide 42 may be supported by one supporting part, and at least one of the three supporting parts may support a y-axis guide so as to be displaceable in the x-axis direction. In this case, as described in Modification Example 4, if the second y-axis slider 44 is configured to open the lower surface of the second y-axis guide 42, one supporting part supporting the second y-axis guide 42 can support the center of the second y-axis guide 42 in the longitudinal direction. That is, the second y-axis guide 42 can be more stably supported.

In addition, for example, the first y-axis guide 32 and the second y-axis guide 42 may be supported by in total five supporting parts. Specifically, for example, the first y-axis guide 32 may be supported by three supporting parts, the second y-axis guide 42 may be supported by two supporting part, and at least one of the five supporting parts may support a y-axis guide so as to be displaceable in the x-axis direction. In this case, as described in Modification Example 4, if the first y-axis slider 34 is configured to open the lower surface of the first y-axis guide 32, the three supporting parts can support both ends of the first y-axis guide 32 and the center of the first y-axis guide in the longitudinal direction. Deflection of the first y-axis guide 32 can be deterred by supporting the center in the longitudinal direction in addition to both ends of the first y-axis guide 32.

Any combination of the embodiment and the modification examples described above can be used as an embodiment of the invention as well. A new embodiment generated by combination has an effect of each of the embodiment and the modification examples that are combined. In addition, it is also clear for those skilled in the art that a function to be carried out by each configuration requirement described in the claims is realized by a single or a combination of respective configuration elements described in the embodiment and the modification examples. For example, a translating carriage according to a claim may be realized in a combination of the first y-axis slider 34, the second y-axis slider 44, and the x-axis unit 20 according to the embodiment.

It should be understood that the invention is not limited to the above-described embodiment, but may be modified into various forms on the basis of the spirit of the invention. Additionally, the modifications are included in the scope of the invention.

What is claimed is:

1. A linear stage comprising:
    first, second, and third supporting parts disposed on a supporting flat surface;
    wherein the third supporting part includes at least one elastic hinge;
    a first shaft supported by the first and second supporting parts and extending in a first direction;
    a second shaft supported by the third supporting part and provided extending in the first direction; and
    a translating carriage translated in the first direction, guided by the first shaft and the second shaft; wherein the translating carriage includes a first slider that forms an air slide together with the first shaft and is floated with respect to the first shaft by compressed gas supplied to the interval between the first slider and the first shaft, where the air slide is translated along the first shaft in a state of non-contact with the first shaft; wherein the second shaft is displaceable in a second direction orthogonal to the first direction and parallel to the supporting flat surface.

2. The linear stage according to claim 1, wherein the first and second supporting parts support the first shaft to be not displaceable in the second direction.

3. The linear stage according to claim 2, wherein:
    the first supporting part supports the first shaft to be not displaceable in the first direction; and
    the second supporting part supports the first shaft to be displaceable in the first direction.

4. A linear stage comprising:
    first, second, third and fourth supporting parts disposed on a supporting flat surface;
    wherein each of the third and fourth supporting parts include at least one elastic hinge;
    a first shaft supported by the first and second supporting parts and extending in a first direction;
    a second shaft supported by the third and fourth supporting parts and provided extending in the first direction; and a translating carriage translated in the first direction, guided by the first shaft and the second shaft; wherein the translating carriage includes a first slider that forms an air slide together with the first shaft and is floated with respect to the first shaft by compressed gas supplied to the interval between the first slider and the first shaft, where the air slide is translated along the first shaft in a state of non-contact with the first shaft; wherein the second shaft is displaceable in a second direction orthogonal to the first direction and parallel to the supporting flat surface.

5. The linear stage according to claim 4, wherein the first and second supporting parts support the first shaft to be not displaceable in the second direction.

6. The linear stage according to claim 5, wherein:
the first supporting part supports the first shaft to be not displaceable in the first direction; and
the second supporting part supports the first shaft to be displaceable in the first direction.

7. The linear stage according to claim 1, wherein said at least one supporting part from among the first and second supporting parts is configured to include a hinge.

8. The linear stage according to claim 4, wherein said at least one supporting part from among the first and second supporting parts is configured to include a hinge.

9. The linear stage according to claim 1, wherein each of the third and the fourth supporting parts include at least one elastic hinge.

10. The linear stage according to claim 4, wherein each of the third and the fourth supporting parts include at least one elastic hinge.

\* \* \* \* \*